Figure 1:
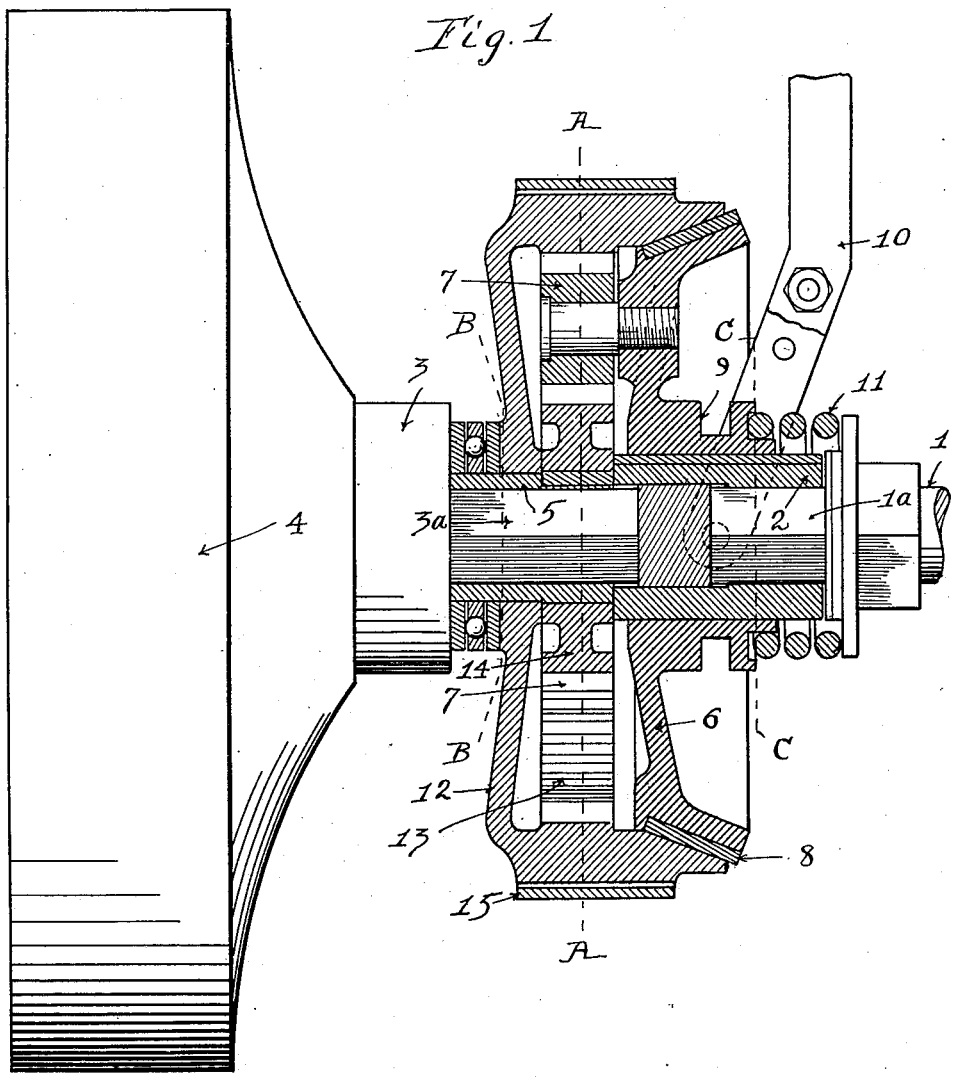

W. C. CARR.
CHANGE SPEED MECHANISM.
APPLICATION FILED OCT. 26, 1917.

1,297,094.

Patented Mar. 11, 1919.
2 SHEETS—SHEET 1.

Inventor:
William C. Carr
by Wm Macomber
Atty.

W. C. CARR.
CHANGE SPEED MECHANISM.
APPLICATION FILED OCT. 26, 1917.
1,297,094.
Patented Mar. 11, 1919.
2 SHEETS—SHEET 2.
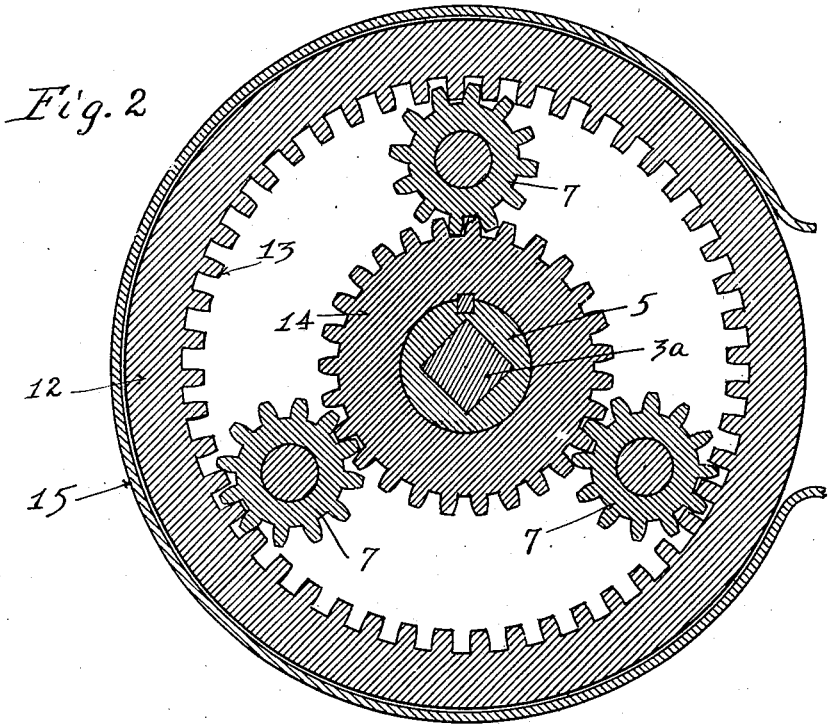
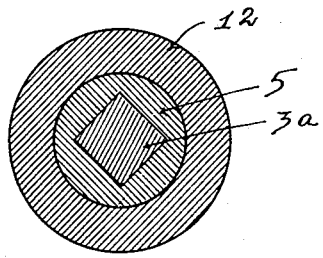
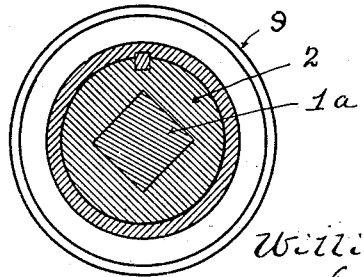
Inventor:
William C. Carr

UNITED STATES PATENT OFFICE.

WILLIAM C. CARR, OF BUFFALO, NEW YORK.

CHANGE-SPEED MECHANISM.

1,297,094.　　　　　Specification of Letters Patent.　　Patented Mar. 11, 1919.

Application filed October 26, 1917.　Serial No. 198,603.

*To all whom it may concern:*

Be it known that I, WILLIAM C. CARR, a citizen of the United States, residing at Buffalo, in the county of Erie and State of New York, have invented certain new and useful Change-Speed Mechanism, of which the following is a specification.

This invention relates to change-speed mechanism, and more particularly to change-speed mechanism of the clutch and planetary gear type.

The object of this invention is to provide, especially for motor-driven vehicles a simple, positive two-speed transmission device which is operable by a single lever, and which is particularly adaptable to motor-driven trucks.

In the annexed drawings, Figure 1 is a central, longitudinal section. Fig. 2 is a section on the line A—A of Fig. 1. Fig. 3 is a section on the line B—B of Fig. 1. Fig. 4 is a section on the line C—C of Fig. 1.

The driving shaft 1 has a squared portion 1$^a$ which fits within a sleeve 2 longitudinally movable thereon. The driven shaft 3 connects with the fly-wheel or a clutch member 4 and has a squared portion 3$^a$ on which there is a sleeve 5.

Keyed to the sleeve 2 is the clutch member 6 to which are pivoted the planetary gears 7, which has the beveled clutch periphery 8 and the collar 9 in which a forked lever 10 engages, and between the end of the sleeve portion of this clutch member and an adjustable collar on the driving shaft 1 is a spring 11 which tends to hold this clutch member in engagement with its mate.

Free to rotate upon the sleeve 5 is the other clutch member 12, which has the internal gear 13 in mesh with the planetary gears 7, and is provided with a clutch surface to engage with the clutch surface 8 of the clutch member 6.

Keyed to the sleeve 5 is a spur-gear 14 which is in mesh with the planetary gears 7.

A brake-band 15 engages over the outer surface of the clutch 12, and this band is controlled by well known mechanism (not shown) actuating the forked lever 10, and this connection is such that when the lever 10 forces the two clutch members out of engagement, it also forces the brake-band 15 into engagement with the clutch member 12 and holds said clutch member against rotation.

It will now be seen that, when the parts are in the position shown in Fig. 1, that is, when the two clutch members are in engagement and the brake band is released, the two shafts 1 and 3 will rotate at a common speed. If, now, the clutch member 6 be forced out of engagement by action of the forked lever 10 against the spring 11 and the brake band 15 be set upon the periphery of the clutch member 12, the planetary gearing will cause the shaft 3 to rotate at a different speed from that of the shaft 1,—the degree of difference being determined by the diameters of the gears.

Having thus described my invention, I claim:

1. The combination with a driving and a driven shaft, of a clutch member slidable over but held in rotation with said driving shaft, a second clutch member mounted freely over said driven shaft, a spur-gear rigid with said driven shaft, gears in mesh therewith and pivoted to said first-mentioned clutch member, an internal gear on said second-mentioned clutch member in mesh with said gears, spring means for normally holding said clutch members in clutch engagement, lever means for disengaging them and means for holding said second-mentioned clutch member against rotation when out of clutch engagement.

2. The combination with a driving and a driven shaft, of a clutch member slidable over but held in rotation with said driving shaft, a second clutch member mounted freely over said driven shaft, a spur-gear rigid with said driven shaft, gears in mesh with said spur-gear and journaled to said first-mentioned clutch member, an internal gear on said second-mentioned clutch member and in mesh with said gears, a spring for normally holding said clutch members in clutch relation, a lever for releasing them, a brake for holding said second-mentioned clutch member against rotation when out of clutch engagement and means for applying said brake and actuated by said lever when said clutches are thrown out of engagement.

WILLIAM C. CARR.